United States Patent
Khmelev et al.

(10) Patent No.: US 11,938,791 B1
(45) Date of Patent: Mar. 26, 2024

(54) PROTECTIVE WINDSHIELD SYSTEM

(71) Applicant: United Services Automobile Association (USAA), San Antonio, TX (US)

(72) Inventors: Yevgeniy Viatcheslavovich Khmelev, San Antonio, TX (US); Oscar Guerra, San Antonio, TX (US); Jeffrey Neal Pollack, San Antonio, TX (US); Janelle Denice Dziuk, Falls City, TX (US); Ashley Raine Philbrick, San Antonio, TX (US); Ryan Thomas Russell, San Antonio, TX (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/736,793

(22) Filed: May 4, 2022

Related U.S. Application Data (63) Continuation of application No. 16/809,226, filed on Mar. 4, 2020, now Pat. No. 11,338,653.

(60) Provisional application No. 62/814,079, filed on Mar. 5, 2019.

(51) Int. Cl.
*B60J 1/20* (2006.01)

(52) U.S. Cl.
CPC ........... *B60J 1/2005* (2013.01); *B60J 1/2094* (2013.01)

(58) Field of Classification Search
CPC ..... B60J 1/20; B60J 1/2011; B60J 3/00; B60J 3/04; B60J 3/007
USPC ............... 296/97.1, 97.2, 96.19, 211
See application file for complete search history.

(56) References Cited

U.S. PATENT DOCUMENTS

| | | | |
|---|---|---|---|
| 4,678,224 A | 7/1987 | F'Geppert | |
| 5,097,563 A | 3/1992 | Cowan | |
| 5,298,732 A * | 3/1994 | Chen | B60J 3/04 351/44 |
| 7,495,747 B2 | 2/2009 | Yoshida et al. | |
| 10,688,971 B2 | 6/2020 | Nielsen | |
| 2006/0012208 A1 | 1/2006 | Brash | |
| 2008/0169670 A1 | 7/2008 | Terakawa | |
| 2009/0058126 A1* | 3/2009 | Broude | B60J 3/04 296/97.2 |
| 2009/0168185 A1* | 7/2009 | Augustine | B60J 3/04 359/613 |

(Continued)

FOREIGN PATENT DOCUMENTS

| | | |
|---|---|---|
| DE | 202018103971 U1 | 7/2018 |
| JP | 2010179817 A * | 8/2010 |

(Continued)

*Primary Examiner* — Amy R Weisberg
*Assistant Examiner* — Dana D Ivey
(74) *Attorney, Agent, or Firm* — Fletcher Yoder, P.C.

(57) ABSTRACT

A vehicle window opacity system that includes a vehicle window system comprising a front windshield, side windows, and a rear window, a liquid crystal display system coupled to the vehicle window system, and a controller coupled to the liquid crystal display system. The controller is operable to control an opacity of a portion of the liquid crystal display system coupled to at least one side window relative to the front windshield to reduce and/or block light from passing through the at least one side window based on information regarding a light source.

20 Claims, 5 Drawing Sheets

(56) References Cited

U.S. PATENT DOCUMENTS

| | | | |
|---|---|---|---|
| 2010/0276962 A1* | 11/2010 | Zhang | B60J 3/00 |
| | | | 296/97.2 |
| 2014/0117701 A1 | 5/2014 | Davis et al. | |
| 2016/0252452 A1 | 9/2016 | Thun et al. | |
| 2016/0363993 A1* | 12/2016 | Leng | B60J 3/04 |
| 2018/0043756 A1* | 2/2018 | Kaphengst | B60J 3/04 |
| 2018/0128044 A1* | 5/2018 | Ochiai | G06V 20/59 |
| 2018/0204538 A1* | 7/2018 | Reckamp | B60K 37/04 |
| 2018/0272996 A1 | 9/2018 | Nielsen | |
| 2019/0351873 A1 | 11/2019 | Dalal | |
| 2020/0150462 A1* | 5/2020 | Cermak | G02F 1/0121 |
| 2020/0290439 A1* | 9/2020 | Witte | G06V 40/168 |
| 2021/0061070 A1* | 3/2021 | Dolson | B60J 3/04 |
| 2021/0354177 A1 | 11/2021 | Bierhals | |
| 2022/0270322 A1* | 8/2022 | Huang | G06F 18/214 |
| 2022/0382087 A1* | 12/2022 | Wang | B60J 3/04 |
| 2023/0020061 A1* | 1/2023 | Todd | G06T 7/70 |

FOREIGN PATENT DOCUMENTS

| | | | |
|---|---|---|---|
| KR | 20170061245 A * | 6/2017 | |
| WO | 8910860 A1 | 11/1989 | |
| WO | 2009060413 A2 | 5/2009 | |

* cited by examiner

PROTECTIVE WINDSHIELD SYSTEM

CROSS-REFERENCE TO RELATED APPLICATION

This application claims priority to U.S. application Ser. No. 16/809,226, filed Mar. 4, 2020, entitled "PROTECTIVE WINDSHIELD SYSTEM," which claims priority to and the benefit of U.S. Provisional Application No. 62/814,079, filed Mar. 5, 2019, entitled "PROTECTIVE WINDSHIELD SYSTEM," hereby incorporated by reference in its entirety for all purposes.

BACKGROUND

The present disclosure relates generally to vehicles.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Vehicle windshields are frequently damaged from car accidents, temperature changes, as well as various debris (e.g., asphalt, rock) found on roads. For example, as vehicles travel at high speeds on roadways their tires may lift debris into the air. This debris may contact a trailing vehicle's windshield at high speeds creating a chip in the windshield glass. Over time, the chip may grow into a larger crack, which may result in an expensive windshield replacement.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one example, the disclosure includes a system with a protective windshield system that deflects particulate away from a vehicle. The protective windshield system includes a sensor that senses the particulate and emits a signal indicative of the particulate. A deflection system deflects the particulate away from the vehicle. A controller couples to the sensor and to the deflection system. The controller detects the particulate and activates the deflection system to deflect the particulate away from the vehicle.

In another example, the disclosure includes a method for protecting a vehicle with a protective windshield system. The method includes detecting a particulate's size and a particulate's velocity. The method determines a probable location of particulate impact on the vehicle using the detected particulate size and the detected particulate velocity. The method then activates the protective windshield system to protect the vehicle from a particulate strike.

In another example, the disclosure includes a vehicle window opacity system. The system includes a vehicle window and a liquid crystal display coupled to the vehicle window. A controller couples to the liquid crystal display and controls the liquid crystal display to reduce and/or block light from passing through the vehicle window.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, vehicle windshields may be damaged by debris, such as gravel and asphalt, kicked up by vehicles traveling at high speeds on roadways. As the debris contacts a trailing vehicle's windshield, it may form a chip in the glass. Over time, the chip may grow into a large crack that extends in one or more directions along the windshield. In order to block and/or reduce chipping of a windshield, a vehicle may include a protective windshield system. As will be explained below, the protective windshield system deflects debris away from the windshield by changing the airflow over an exterior surface of the vehicle, which moves the particulate away from the windshield. While the figures described below include a car as the vehicle, it should be understood that the term vehicle includes trucks, sport utility vehicles, boats, motorcycles, buses, among others. Furthermore, while the disclosure focuses on protection of windshields, it should be understood that the disclosed protective windshield system may also be employed to protect other aspects of a vehicle (e.g., sensors, antenna, and lights).

The disclosure below also describes a vehicle window opacity system capable of changing the amount of light that passes through one or more vehicle windows. For example, the vehicle window opacity system may decrease the opacity of the windshield in response to direct sunlight, vehicle headlights, etc. to assist a driver in viewing his or her surroundings.

Figure 1:
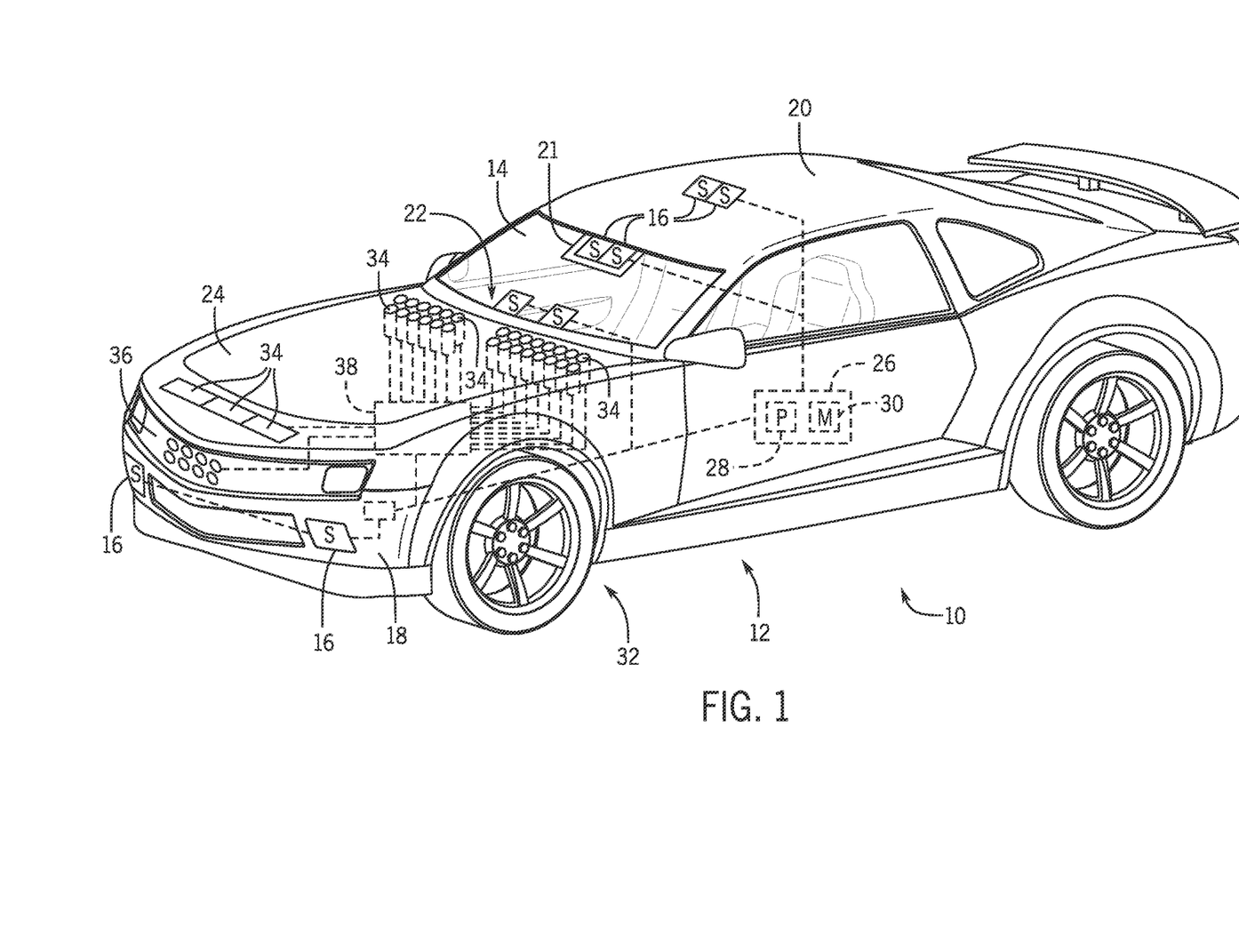
FIG. 1 is a perspective view of a vehicle with a protective windshield system, in accordance with embodiments described herein.

FIG. 1 is a perspective view of a vehicle 10 with a protective windshield system 12. In operation, the protective windshield system 12 enables the detection and deflection of particulate material that may strike a windshield 14 (or other area) of the vehicle 10. The protective windshield system 12 may include multiple sensors 16 that enable particulate detection and tracking. These sensors 16 may couple to the vehicle 10 in various locations including the bumper 18, vehicle roof 20, rear view mirror 21, dashboard 22, hood 24, among others.

The sensors 16 may include an optical camera, LIDAR, and/or radar sensors that can be used to detect and track particulate. In some embodiments, the protective windshield system 12 may include different types of sensors 16 to provide redundant detection and tracking of particulate. For example, a controller 26 of the protective windshield system 12 may use an optical sensor in combination with a radar sensor. In operation, the controller 26 compares the signals from the optical sensor and the radar sensor to confirm detection of particulate approaching the windshield 14. In addition to redundant detection and tracking of the particulate, the protective windshield system 12 may include different types of sensors 16 in order to provide detection and tracking of particulate in different kinds of weather (e.g., rain, snow) and/or light conditions (e.g., night, morning, day, evening). For example, an optical sensor, such as a camera, may not be able to detect particulate at night or in lowlight conditions. Accordingly, by including another type of sensor 16, such as radar or LIDAR, the protective windshield system 12 may still detect and track particulate approaching the windshield 14 in various conditions (e.g., low light).

In some embodiments, the controller 26 may receive additional input from other sensors 16 as well as the vehicle 10. For example, the protective windshield system 12 may include one or more sensors 16 (e.g., airflow sensors) that detect the magnitude and direction of the wind with respect to the vehicle 10 (e.g., crosswinds). The controller 26 may use this information to determine whether the particulate will strike the vehicle 10 as well as where on the vehicle 10 the particulate will strike. That is, the sensors 16 may enable the controller 26 to determine if wind blowing around the vehicle 10 (e.g., crosswinds) will push the particulate sufficiently out of the path of the oncoming windshield 14. The controller 26 may also receive input regarding the vehicle's speed and atmospheric conditions, which may enable the controller 26 determine a boundary layer (e.g., fluid conditions proximate the vehicle's outermost surfaces) surrounding the vehicle 10 and the effect the boundary layer will have on the particulate.

In the illustrated embodiment, the controller 26 includes a processor 28, such as the illustrated microprocessor 28. The controller 26 may also include one or more memory or storage devices 30 as well as other suitable components. The processor 28 may be used to execute software, such as software that enables the protective windshield system 12 to detect the size, velocity, and trajectory of particulate relative to the vehicle 10. Moreover, the processor 28 may include multiple microprocessors, one or more "general-purpose" microprocessors, one or more special-purpose microprocessors, and/or one or more application specific integrated circuits (ASICS), or some combination thereof. For example, the processor 28 may include one or more reduced instruction set computer (RISC) processors.

The memory device 30 may include a volatile memory, such as random access memory (RAM), and/or a nonvolatile memory, such as read-only memory (ROM). The memory device 30 may store a variety of information and may be used for various purposes. For example, the memory device 30 may store processor executable instructions (e.g., firmware or software) for the processor 28 to execute, such as instructions for activating a deflection system 32 that deflects particulate away from the windshield 14 and/or other portions of the vehicle 10. The storage device(s) (e.g., nonvolatile memory) may include ROM, flash memory, a hard drive, or any other suitable optical, magnetic, or solid-state storage medium, or a combination thereof. The storage device(s) may store data, instructions, and any other suitable data.

The deflection system 32 may include a plurality of conduits 34 positioned at various locations on the vehicle 10. For example, the conduits 34 may be positioned in and/or on a vehicle grill 36, the vehicle hood 24, the windshield pillars, among other locations on the vehicle 10. These conduits 34 may receive compressed air and/or another fluid (e.g., water) through lines that connect to one or more compressors 38. In some embodiments, the release of compressed air through the conduits 34 may be simultaneous. That is, once the controller 26 detects that a rock, a piece of asphalt, bug, bird poop, and/or other particulate will contact the windshield 14, the controller 26 may signal the compressor 38 to release compressed air to all of the conduits 34. This may create a type of air wall that deflects the particulate away from the windshield 14 or other feature/portion of the vehicle 10. In some embodiments, the air may also atomize some particulate matter (e.g., bird poop) so that a large mass does not cover the windshield and reduce a driver's visibility. In some embodiments, the release of compressed air from the conduits 34 may be localized. In other words, not all of the conduits 34 may simultaneously release compressed air. For example, the protective windshield system 12 may include release systems and/or mechanisms that selectively control the release of compressed air from individual conduits 34 and/or groups of conduits 34. This may conserve energy and make the deflection system 32 more efficient. In operation, the controller 26 may detect particulate as well as determine the probable impact location on the vehicle 10 (e.g., upper right-hand corner of the windshield 14). Activation or release of compressed air from all of the conduits 34 may therefore be unnecessary. Accordingly, the controller 26 may control the release of compressed air from a subset of the conduits 34 that are proximate the impact area and/or most able to deflect particulate away from the vehicle 10.

The protective windshield system 12 may also detect the size of the particulate with the sensors 16. The controller 26 may take into account the size of the particulate in determining the number and the location of conduits 34 to be activated. For example, if the particulate is small, a limited number of conduits 34 may be used. In contrast, if the particulate is large, the controller 26 may release air through a greater number of conduits. In a different embodiment, the larger particulate may be manipulated by focusing output via a limited number of conduits 34. For example, all pressure available to the system may be output via a small subset or a single one of the conduits 34 to focus energy and increase the likelihood of moving the particle away from an impact zone. In some embodiments, the amount and/or pressure of the air released by the conduits 34 may also be adjusted to account for the size the particulate. For example, if the particulate is large the pressure of the air released through the conduit 34 may be greater than if the particulate were small.

The controller 26 may also take into account the velocity of the particulate in determining the number of conduits 34 to be activated and/or the pressure of the air released through the conduit 34. For example, a small particulate traveling at a high speed may have a momentum greater than a large particulate traveling at a slow speed. The controller 26 may therefore release air through more conduits 34 and/or air at a greater pressure to deflect a small particulate traveling at high speed than it would for a large particulate traveling at a slow speed.

As illustrated, the conduits 34 may come in a variety of sizes and shapes. For example, the conduits 34 may have round outlets, square outlets, rectangular outlets, oval outlets, among others. The conduits 34 may also be organized into rows and/or groupings in order to facilitate deflection of particulate away from the vehicle 10, and in particular the windshield 14. In other words, a matrix of the conduits 34 may be utilized to facilitate efficient targeting.

In some embodiments, the protective windshield system 12 may determine that the particulate will contact the windshield 14 even with activation of the deflection system 32. In response to this condition, the protective windshield system 12 may activate the deflection system 32 to redirect the particulate to a position on the vehicle 10 and/or windshield that will create the least damage (e.g., easily replaceable part, least expensive part). The deflection system 32 may also be controlled to put a spin on an object so that the particulate glances off the vehicle 10.

Figure 2:
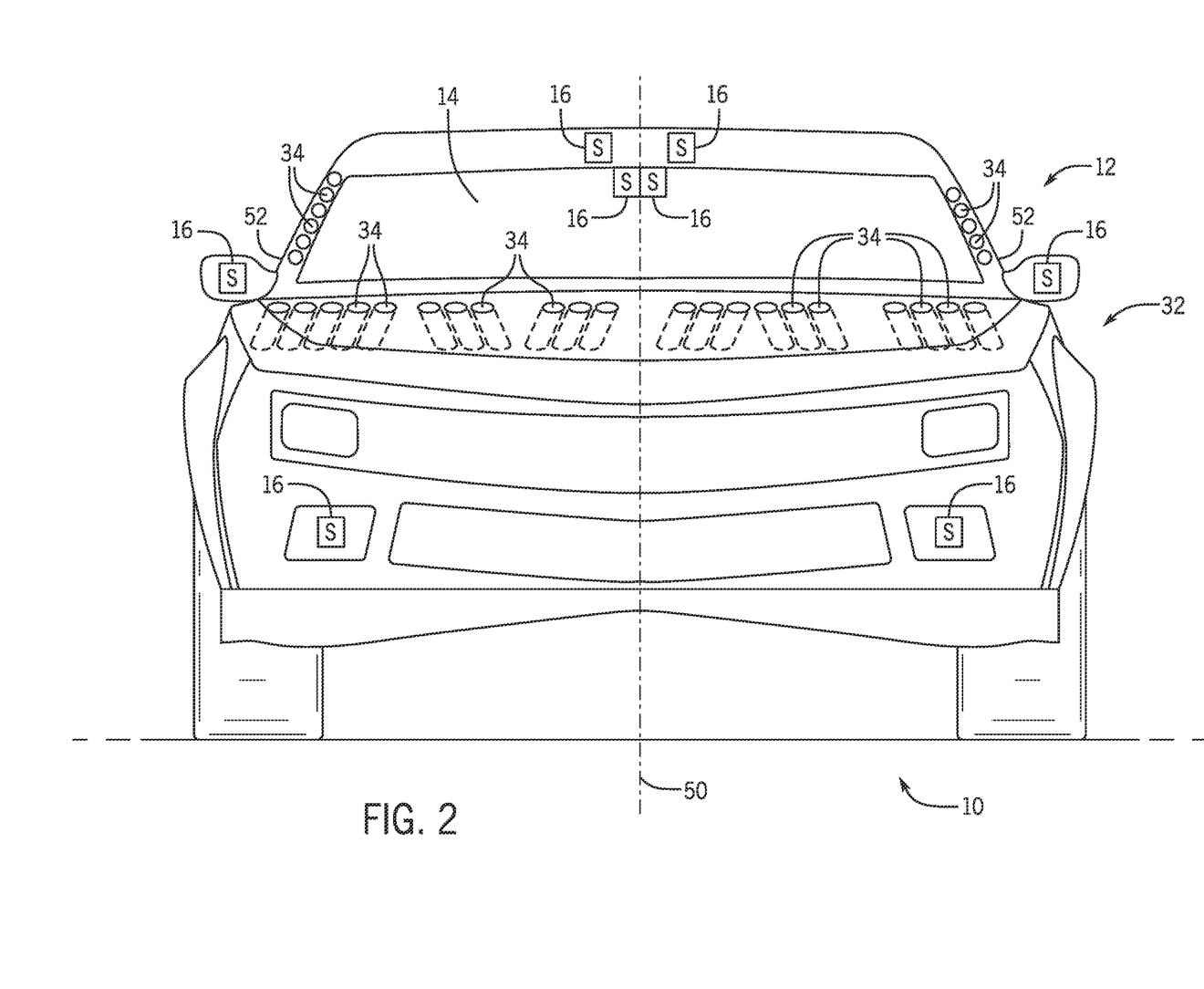
FIG. 2 is a front view of a vehicle with a protective windshield system, in accordance with embodiments described herein.

FIG. 2 is a perspective view of a vehicle 10 with a protective windshield system 12. In some embodiments, the protective windshield system 12 may use the sensors 16 to detect nearby traffic (e.g., cars, trucks, animals, pedestrians). The controller 26 may take into account the detected traffic when activating the deflection system 32. For example, if traffic is detected behind the vehicle 10, the controller 26 may activate the deflection system 32 to redirect the particulate to the right or left of the vehicle 10 and therefore away from the detected traffic. The controller 26 may also drive the particulate away from neighboring traffic by driving the particulate further away from the traffic. For example, if traffic is detected to the right of the vehicle, the controller 26 may increase the pressure and/or air volume (e.g., number of conduits 34) used by the deflection system 32 in order to drive the particulate far enough to the right to avoid contact with the detected traffic. In another example, the controller 26 may lift the particulate far enough in the air that traffic behind the vehicle 10 may pass underneath the particulate.

In order to drive the particulate to the left and/or to the right of the vehicle 10, the conduits 34 may be angled relative to a central axis 50 of the vehicle 10. For example, the conduits 34 may be arranged into groups that are angled towards the left of the vehicle 10 as well as to the right of the vehicle 10. The conduits 34 may also be placed proximate the windshield pillars or beams 52 located on the left and right sides of the windshield 14 to facilitate driving particulate to the left and to the right of the vehicle 10.

Figure 3:
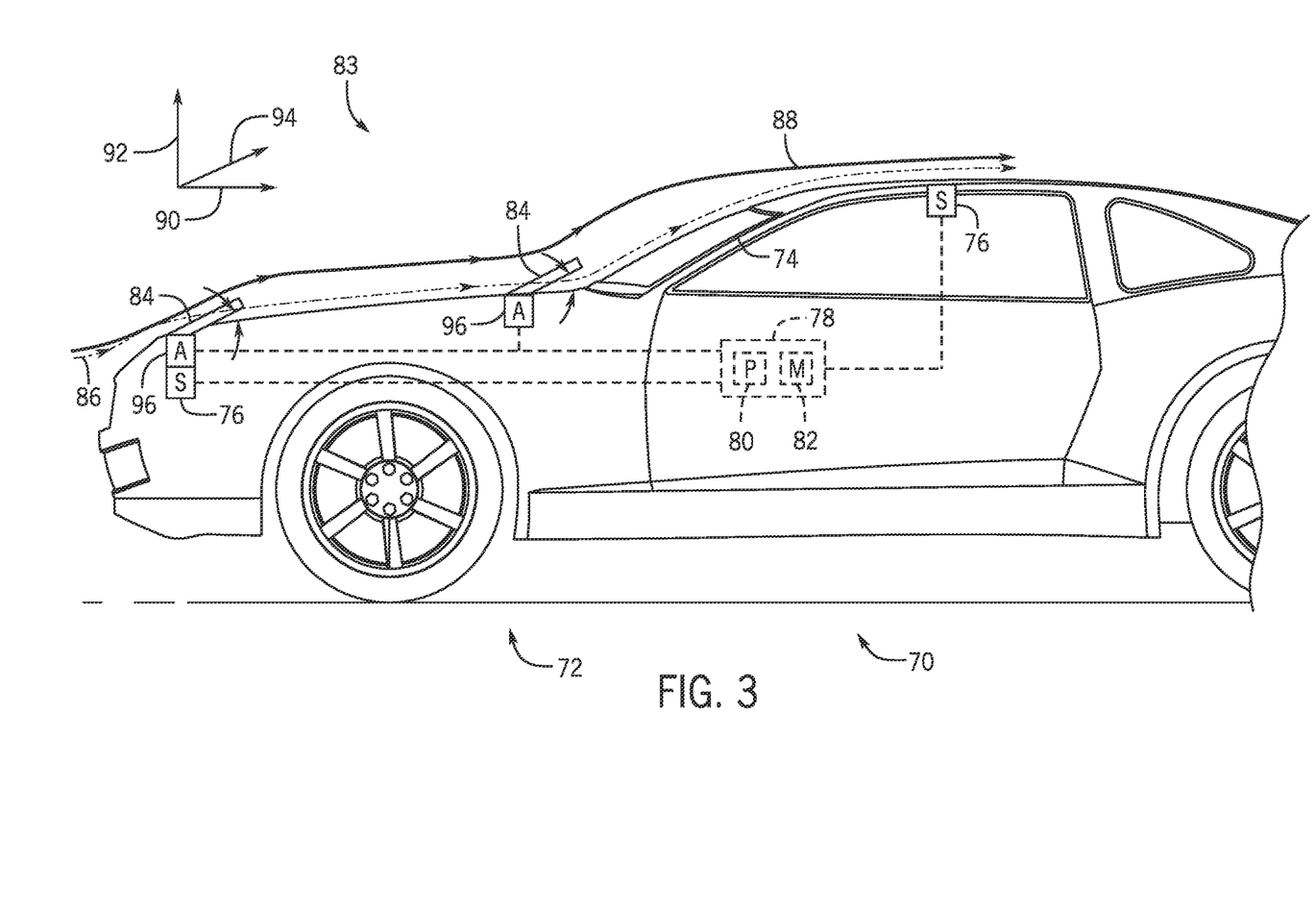
FIG. 3 is a partial side view of a vehicle with a protective windshield system, in accordance with embodiments described herein.

FIG. 3 is a perspective view of a vehicle 70 with a protective windshield system 72. In operation, the protective windshield system 72 enables the detection and deflection of particulate material that may strike a windshield 74 of the vehicle 10. The protective windshield system 72 may include multiple sensors 76 that enable particulate detection and tracking. These sensors 76 may couple to the vehicle 70 in various locations including the bumper, vehicle roof, rear view mirror, dashboard, hood, among others to facilitate particulate detection.

The sensors 76 may include an optical camera, LIDAR, and/or radar sensors that enable detection and tracking of particulate. In some embodiments, the protective windshield system 72 may include different types of sensors 76 to provide redundant detection and tracking of particulate, as well as detection and tracking of particulate in different kinds of weather (e.g., rain, snow) and/or light conditions (e.g., night, morning, day, evening).

A controller 78 may also receive additional input from additional sensors 76 as well as the vehicle 70. For example, the protective windshield system 72 may include one or more sensors (e.g., airflow sensors) that enable the detection of wind with respect to the vehicle 70 (e.g., crosswind). These sensors 76 may detect the magnitude and direction of the wind with respect to the vehicle 70. The controller 78 may use this information to determine whether the particulate will strike the vehicle 70 as well as where on the vehicle 70 the particulate will strike. That is, the sensors 76 may enable the controller 78 to determine if wind blowing around the vehicle 10 will push the particulate sufficiently out of the path of the oncoming windshield 74. The controller 78 may also receive input regarding the vehicle's speed, which may enable the controller 78 determine the effect of the boundary layer around the vehicle on the particulate.

The controller 78 includes a processor 80, such as the illustrated microprocessor, and a memory device 82. The processor 80 may be used to execute software, such as software that enables the protective windshield system 72 to detect the size, velocity, and trajectory of particulate relative to the vehicle 70. The memory device 30 may store processor executable instructions (e.g., firmware or software) for the processor 80 to execute, such as instructions for activating the deflection system 83 that deflects particulate away from the windshield 74 and/or other portions of the vehicle 70.

The deflection system 83 may include one or more rigid and/or semi-rigid flaps 84 positioned at various locations on the vehicle 10. For example, the flaps 84 may be positioned in and/or on a vehicle grill, the vehicle hood, among other locations on the vehicle 70. The flaps 84 may both physically deflect particulate away from the windshield 74 and/or change the boundary layer, which may then carry the particulate away from the windshield 74 (e.g., over the windshield 74, to the side of the vehicle 10, under the vehicle 10) depending on the orientation of the flaps 84.

As illustrated in FIG. 3, the original boundary layer of air over the vehicle 70 is illustrated by the dashed line 86. As the flaps 84 transition from a lowered position to a raised position, the flaps 84 change the boundary layer from its original position illustrated by dashed line 86 to a second or raised position illustrated by the solid line 88. In the raised position illustrated by solid line 88, the boundary layer is further away from the exterior surface of the vehicle 70 and thus from the windshield 74. Accordingly, as particulate approaches the windshield 74 in direction 90, the particulate may become entrained in the raised boundary layer illustrated by line 88 and carried up and over the vehicle 70 in direction 92, which may block contact between the particulate and the windshield 74.

The deflection system 83 may include multiple flaps 84. These flaps 84 (e.g., 1, 2, 3, 4, 5, or more) may be arranged sequentially from the front of the vehicle 70 towards the windshield 74. The deflection system 83 may also include multiple flaps 84 (e.g., 1, 2, 3, 4, 5, or more) that extend across the vehicle 70 in direction 94. By including multiple flaps that extend across the vehicle 70 in direction 94, the deflection system may activate some of the flaps 84 depending on the projected point of impact on the vehicle 70. For example, if the projected impact is expected to contact the left half of the windshield 74, the deflection system 83 may activate the flaps 84 on the left side of the vehicle 70.

The controller 78 activates the flaps 84 with actuators 96. The actuators 96 rotate the flaps 84 between a raised and a lowered position depending on the detection of particulate. That is, when the controller 78 detects that a rock, a piece of asphalt and/or, other particulate will contact the windshield 74, the controller 78 may signal the actuators 96 to rotate the flaps 84. As the flaps 84 rotate, they change the boundary layer that extends around the vehicle 70. The boundary layer of air may then carry the particulate up, over the vehicle 70, and out of contact with the windshield 74. In some embodiments, the controller 78 may not raise the flaps 84 to a fully raised position but instead to a position between a fully raised position and a lowered position. For example, the controller 78 in response to feedback from the sensors 76 may determine what change in the boundary layer will block and/or reduce contact with the windshield 74. In response, the controller 78 may determine that the flaps 84 may remain in a lowered position, a completely raised position, or a position between a completely raised position and completely lowered position. By tailoring the response of the flaps 84, depending on the projected impact, the deflection system 83 may reduce its impact on the fuel efficiency of the vehicle 70. That is, the deflection system 83 may reduce the effect it has on the aerodynamic resistance of the vehicle 70 as it travels through air. It should be understood that in some embodiments, a protective windshield system (e.g., protective windshield system 12, 72) may include both the deflection system 83 and the deflection system 32. Together the deflection systems 83 and 32 may reduce or block contact of particulate with a vehicle windshield or another part of the vehicle.

Figure 4:
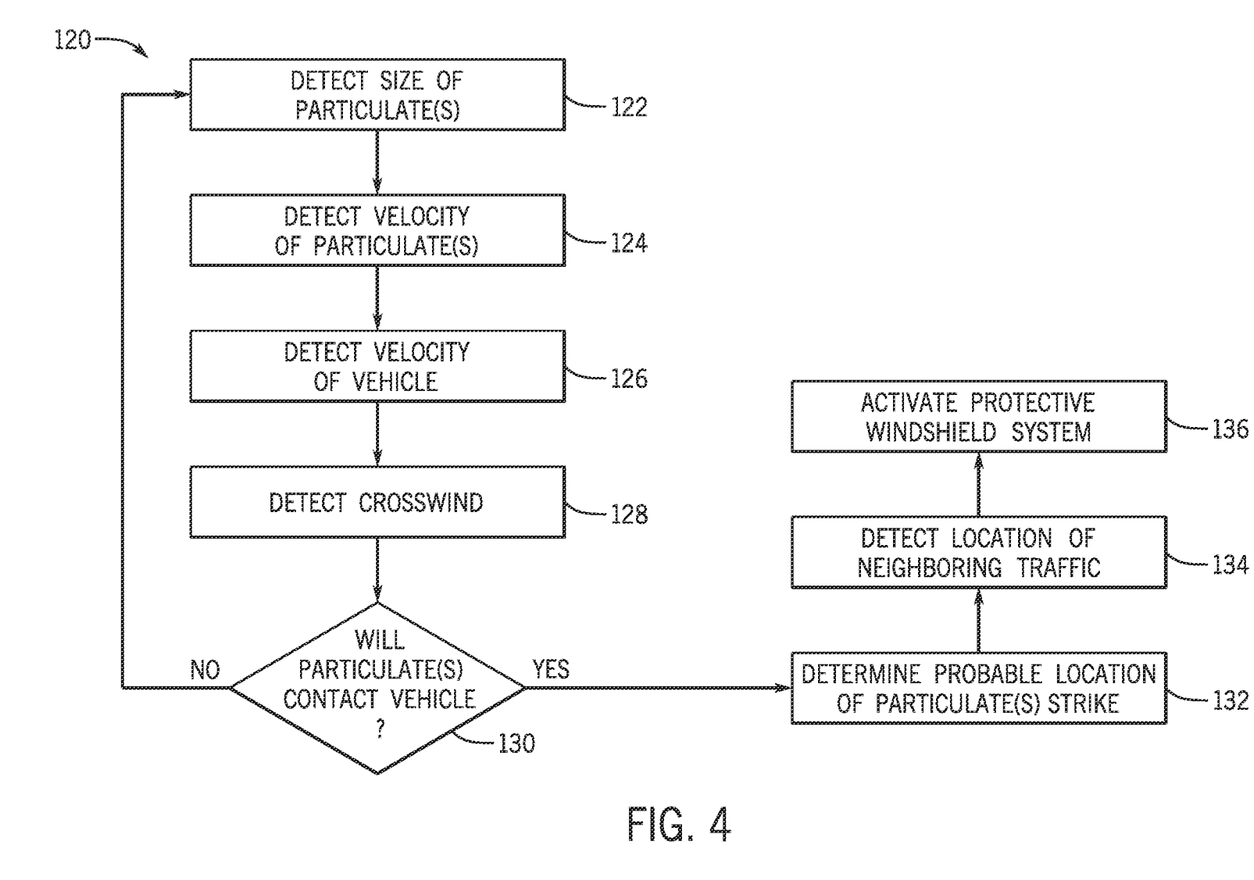
FIG. 4 illustrates a flow chart of a method for protecting a vehicle with a protective windshield system, in accordance with embodiments described herein.

FIG. 4 illustrates a flow chart of a method 120 of protecting a vehicle with a protective windshield system 12, 72. It should be understood that the method 120 below may include some or all the steps illustrated. Furthermore, it should be understood that the steps of the method 120 may not be performed in the specific order shown. The method 120 illustrated in FIG. 4 begins by detecting the size of the particulate, step 122. The method 120 may also detect the velocity of the particulate, step 124. By detecting the size and the velocity of the particulate, the method 120 may determine the momentum of the particulate. The momentum of the particulate may then be used by the protective windshield system 12, 72 to determine an appropriate response with the deflection system 32 and/or 83. The method 120 may then detect a velocity of the vehicle and thus characteristics of the boundary layer around the vehicle. In some embodiments, the method 120 may also detect any crosswinds, which may drive the particulate away from the vehicle and/or change its potential impact location, step 128. After collecting the size of the particulate, the velocity of the particulate, the velocity of the vehicle, and any crosswind, the method 120 determines if the particulate will contact the vehicle, step 130.

If the particulate is unlikely to contact or will not contact the vehicle, the method 120 returns to step 122 where it continues to monitor and detect particulate. If the answer is yes, the method 120 determines the probable location of a particulate strike, step 132. The method 120 may then determine the existence and location of neighboring traffic, step 134. As explained above, neighboring traffic may include pedestrians and/or other vehicles nearby. By detecting neighboring traffic, the protective windshield system 12, 72 may block and/or reduce contact between the particulate and neighboring traffic while driving particulate away from the vehicle. The method 120 then activates the deflection system 32, 83 to deflect particulate away from the windshield and/or other portions of the vehicle. As explained above, the protective windshield system 12, 72 may use compressed air discharged through one or more conduits 34 and/or raise flaps 84 of the deflection system(s) 32, 83 to change the boundary layer of air moving over the vehicle to drive particulate away from the vehicle (e.g., windshield). In some embodiments, other compressed fluids (e.g., water) may be utilized. In some embodiments, multiple fluids may be used together or selected based on the nature of the deflection desired. For example, water may be selected to deflect a piece of particulate that is deemed to have a relatively large mass while air may be used to deflect a smaller mass.

Figure 5:
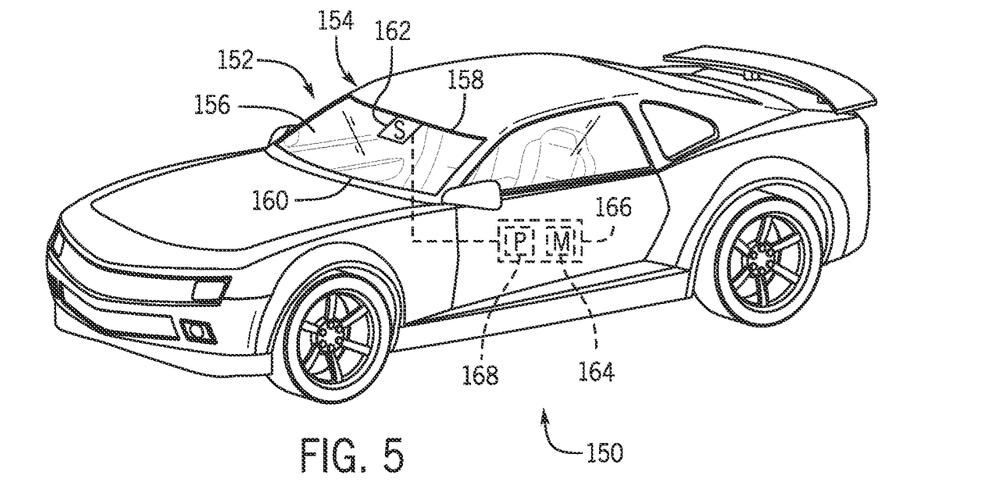
FIG. 5 is a perspective view of a vehicle with a vehicle window opacity system, in accordance with embodiments described herein.

FIG. 5 is a perspective view of a vehicle 150 with a vehicle window opacity system 152. In operation, the vehicle window opacity system 152 controls the intensity of light entering the vehicle 150 by activating a liquid crystal display 154 coupled to the windshield 156. The liquid crystal display 154 may extend over the entire windshield 156 or just a portion of it. For example, the liquid crystal display 154 may extend over 1-25%, 1-50%, 1-75% of the windshield 156 in a direction extending from a first end 158 towards a second end 160 of the windshield 156.

The vehicle window opacity system 152 may include one or more sensors 162 (e.g., optical sensors) that detect the position of a vehicle driver's eyes as well as the location of incoming light from a light source external to the vehicle 150 (e.g., sun, vehicle headlamps). The sensors 162 couple to a controller 164. In response to information received, the controller 164 executes instructions stored on a memory 166 with a processor 168 to change the opacity of the liquid crystal display 154 to block and/or reduce the intensity of external light on the driver's eyes. For example, the sensors 162 may detect direct sunlight at the eye level of the driver. The controller 164 may then darken the liquid crystal display 154 at the eye level of the driver to block and/or reduce the intensity of this light. In some embodiments, the vehicle window opacity system 152 may also take into account the eyes of passengers in the vehicle in addition to the driver's and customizes the darkening of the liquid crystal display for both the driver and the passenger(s). That is, more of the liquid crystal display 154 may darken depending on the eye level of the driver and the passenger. In some embodiments and depending on the eye level of the passenger more of the liquid crystal display 154 may darken proximate a passenger than proximate the driver or vise versa. For example, if the passenger is shorter than the driver more of the liquid crystal display 154 proximate the passenger may darken than for the driver in order reduce the intensity of light reaching the eyes of the passenger. The extent of the darkening may also be customized depending on the desire of the driver and/or passenger(s). For example, some drivers/passengers may want to block all light at eye level while others may want a reduction in the intensity. The vehicle window opacity system 152 may therefore include input devices (e.g., buttons) that enable adjustment of the liquid crystal display's opacity.

In some embodiments, the vehicle window opacity system 152 may be incorporated into other windows of the vehicle 150 (e.g., side windows, rear window). The vehicle window opacity system 152 may block or reduce light through these windows as well. In some embodiments, the vehicle window opacity system 152 may be used to block/censor items from passenger view (e.g., children) such as adult establishments, car wrecks, objectionable advertisements, among others.

Figure 6:
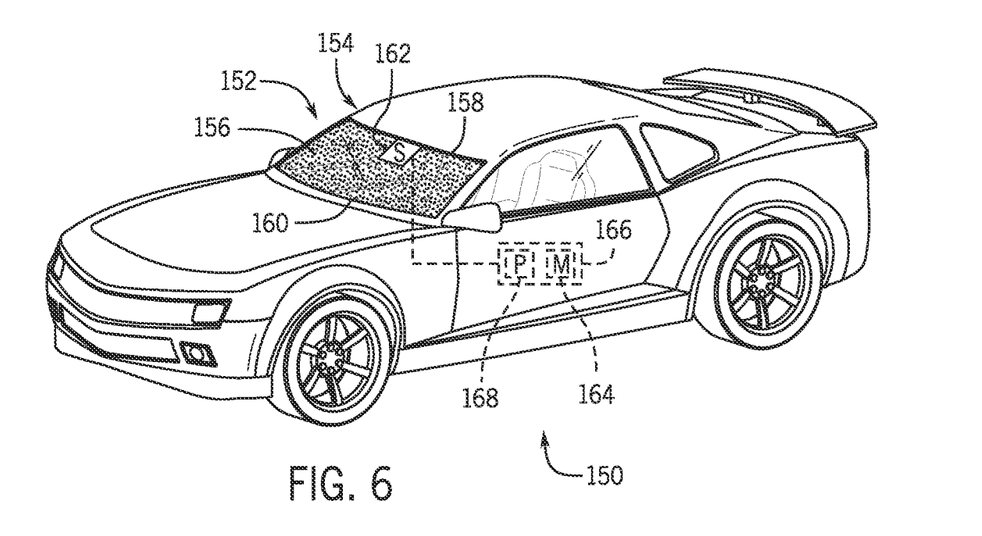
FIG. 6 is a perspective view of a vehicle with a vehicle window opacity system, in accordance with embodiments described herein.

FIG. 6 is a perspective view of the vehicle 150 with the vehicle window opacity system 152 in an active state. As explained above, in the active state the vehicle window opacity system 152 reduces and/or blocks light through a vehicle window, such as the windshield 156. While FIG. 6 illustrates the vehicle window opacity system 152 reducing light through the entire windshield 156, it should be understood that the vehicle window opacity system 152 may reduce and/or block light through only a portion of the windshield 156 and/or another window of the vehicle 150. In some embodiments, the vehicle window opacity system 152 may vary the opacity of one or more windows on the vehicle 150 relative to other windows. For example, the vehicle window opacity system 152 may decrease the opacity of side windows relative to the windshield 156 in response sun hitting the side windows. In still other embodiments, the vehicle window opacity system 152 may vary the opacity at various locations on a single window.

The technical effects of the systems and methods described herein include detecting particulate that may contact a vehicle with a controller coupled to one or more sensors. The controller may then activate a particulate deflection system in response to the detected particulate to deflect particulate away from the vehicle, which may block and/or reduce particulate strikes on the vehicle (e.g., windshield). Another technical effect of the systems and methods described therein include the ability to change the opacity of a vehicle window.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A vehicle window opacity system, comprising:
   a vehicle window system comprising a front windshield, side windows, and a rear window;
   a liquid crystal display system coupled to the vehicle window system; and
   a controller coupled to the liquid crystal display system and configured to control the liquid crystal display system to increase an opacity of a portion of the liquid crystal display system coupled to at least one side window relative to the front windshield to block light from passing through the at least one side window in order to block an accident from a view of a passenger.

2. The system of claim 1, comprising a sensor configured to detect light from a light source and provide information regarding the light from the light source to the controller, wherein the controller is configured to use the information to adjust the opacity of the portion of the liquid crystal display system to limit or block the light from the light source from passing therethrough.

3. The system of claim 2, wherein the controller is configured to use the information to determine a relative location of the light source with respect to the vehicle window system and determine the portion of the liquid crystal display system based on the relative location.

4. The system of claim 1, comprising a sensor configured to detect light from a light source and provide information regarding the light from the light source to the controller, wherein the controller is configured to use the information to determine an intensity of the light from the light source and adjust the opacity of one or more portions of the liquid crystal display system based on the intensity.

5. The system of claim 1, comprising a sensor configured to detect an eye of a person within a vehicle having the vehicle window system and provide information indicative of a position of the eye relative to the vehicle window system to the controller, wherein the controller is configured to adjust the opacity of a respective portion and/or an additional portion of the liquid crystal display system to reduce and/or block an intensity of a light source from passing through the vehicle window system based on the position of the eye.

6. The system of claim 1, comprising:
   a first sensor configured to detect light from a light source and provide first information regarding the light from the light source to the controller; and
   a second sensor configured to detect an eye of a person within a vehicle having the vehicle window system and provide second information indicative of a position of the eye relative to the vehicle window system to the controller, wherein the controller is configured to use the first information and the second information to adjust the opacity of the portion or an additional portion of the liquid crystal display system to reduce and/or block light from passing through the vehicle window system and into the eye.

7. The system of claim 1, wherein the controller is configured to block the accident from the view of the passenger by:
   determining the portion of the at least one side window corresponding to a position of an eye of the passenger.

8. The system of claim 1, wherein the controller is configured to adjust the opacity of the liquid crystal display system based on a user input.

9. The system of claim 8, wherein the controller is configured to:
   adjust a first portion of the liquid crystal display system to a first opacity level; and
   adjust a second portion of the liquid crystal display system to a second opacity level, different from the first opacity level.

10. A method for changing an opacity of a vehicle window system, the method comprising:

determining, via a controller, an intensity of a light source;

determining, via the controller, a location of the light source relative to the vehicle window system comprising a front windshield, side windows, and a rear window; and adjusting, via the controller, an opacity of a portion of a liquid crystal display system coupled to the vehicle window system to limit or block the intensity of the light source entering at least one side window to block an accident from a view of a passenger without making a corresponding adjustment in an opacity of an additional portion of the liquid crystal display system corresponding to the front windshield.

11. The method of claim 10, comprising:

receiving, via the controller, a signal indicative of a light from the light source from an optical sensor; and determining, via the controller, an intensity of the light and/or the location of the light source based on the signal.

12. The method of claim 10, comprising:

receiving, via the controller, a first signal from a first sensor, wherein the first signal is indicative of the intensity of the light source and/or the location of the light source;

receiving, via the controller, a second signal from a second sensor, wherein the second signal is indicative of an eye level of a user;

determining, via the controller, the additional portion of the liquid crystal display system corresponding to the eye level of the user; and adjusting, via the controller, the opacity of the additional portion of the liquid crystal display system to block or reduce the intensity of light entering the vehicle window system at the additional portion of the liquid crystal display system.

13. The method of claim 10, comprising:

receiving, via the controller, a user input from the passenger associated with an additional opacity level of the liquid crystal display system; and adjusting, via the controller, the opacity of the portion of the liquid crystal display system based on the user input.

14. The method of claim 10, comprising:

receiving, via the controller, a user input associated with an additional opacity level of the liquid crystal display system; and adjusting, via the controller, the opacity of the liquid crystal display system to the additional opacity level based on the user input.

15. The method of claim 10, wherein adjusting, via the controller, the opacity of the portion of the liquid crystal display system coupled to the vehicle window system to limit or block the intensity of the light source entering the at least one side window to block the accident from the view of the passenger comprises:

receiving, via the controller, a first signal from a first sensor, wherein the first signal is indicative of an additional eye level of the passenger;

determining, via the controller, a respective portion of the liquid crystal display system corresponding to the additional eye level of the passenger; and increasing, via the controller, the opacity of the portion of the liquid crystal display system coupled to the at least one side window to censor an accident from the passenger based on detection of the accident.

16. A system, comprising:

a vehicle window system comprising a front windshield, side windows, and a rear window and coupled to a liquid crystal display system; and a controller configured to:
  detect an eye level of a user;
  detect an additional eye level of an additional user;
  detect an intensity of light passing through a portion of at least one side window corresponding to the additional eye level of the additional user; and
  adjust a first opacity of a first portion of the liquid crystal display system coupled to the at least one side window to censor an accident from the additional user based on detection of the accident.

17. The system of claim 16, wherein the controller is configured to:
  detect the eye level of the user;
  detect an intensity of the light passing through a second portion of the front windshield corresponding to the eye level of the user; and
  adjust a second opacity of the second portion of the liquid crystal display system coupled to the front windshield and corresponding to the eye level of the user based on a position of the light to reduce the intensity of the light passing through the second portion of the front windshield.

18. The system of claim 17, wherein the controller is configured to:
  adjust the first opacity of the first portion of the liquid crystal display system to a first opacity level based on the intensity of the light passing through the portion of the at least one side window; and
  adjust the second opacity of the second portion of the liquid crystal display system to a second opacity level based on the intensity of the light passing through the second portion of the vehicle window system, wherein the second opacity level is different from the first opacity level.

19. The system of claim 16, wherein the controller is configured to:
  detect an additional intensity of the light passing through an additional portion of the front windshield corresponding to the eye level of the user; and
  adjust a second opacity of a second portion of the liquid crystal display system to reduce the additional intensity of the light passing through the additional portion of the front windshield.

20. The system of claim 16, wherein the controller is configured to adjust an opacity of the liquid crystal display system to an opacity level indicated by a user preference.

* * * * *